(12) United States Patent
Ma et al.

(10) Patent No.: US 12,328,549 B2
(45) Date of Patent: Jun. 10, 2025

(54) INTEGRATED BONE CONDUCTION SOUND GENERATING DEVICE AND METHOD

(71) Applicant: THUNDER BLAST TECHNOLOGY CO., LIMITED, Hong Kong (CN)

(72) Inventors: Lei Ma, Hong Kong (CN); Jiahong Ma, Hong Kong (CN); Mile Zhang, Hong Kong (CN); Yauming Chiu, Hong Kong (CN)

(73) Assignee: THUNDER BLAST TECHNOLOGY CO., LIMITED, Hong Kong (CN)

( * ) Notice: Subject to any disclaimer, the term of this patent is extended or adjusted under 35 U.S.C. 154(b) by 207 days.

(21) Appl. No.: 18/073,168

(22) Filed: Dec. 1, 2022

(65) Prior Publication Data

US 2023/0101898 A1 Mar. 30, 2023

Related U.S. Application Data

(63) Continuation of application No. PCT/CN2020/093922, filed on Jun. 2, 2020.

(51) Int. Cl.
*H04R 1/02* (2006.01)
*G06F 3/16* (2006.01)
(Continued)

(52) U.S. Cl.
CPC ............ *H04R 23/02* (2013.01); *G06F 3/162* (2013.01); *H04R 1/028* (2013.01); *H04R 1/24* (2013.01); *H04R 3/00* (2013.01); *H04R 7/04* (2013.01); *H04R 9/025* (2013.01); *H04R 9/06* (2013.01); *H04R 17/00* (2013.01); *H04R 2460/13* (2013.01)

(58) Field of Classification Search
None
See application file for complete search history.

(56) References Cited

U.S. PATENT DOCUMENTS

2006/0104456 A1* 5/2006 Filo ................ A61C 17/221
381/124
2019/0014425 A1* 1/2019 Liao ................ H04R 9/066
(Continued)

FOREIGN PATENT DOCUMENTS

| CN | 101836466 A | 9/2010 |
| CN | 102461211 A | 5/2012 |

(Continued)

OTHER PUBLICATIONS

English machine translation of JP 2015186130 A (Year: 2015).*
(Continued)

*Primary Examiner* — James K Mooney
(74) *Attorney, Agent, or Firm* — J.C. PATENTS

(57) ABSTRACT

Provided in the present disclosure are an integrated bone conduction sound generating device and method. The device includes a controller, a sound generating structure and a functional structure, and the three components are integrated together. The functional structure can touch the oral cavity and/or the teeth of the human body, and after the controller drives the sound generating structure to generate a vibration signal, the functional structure can transmit the vibration signal to the auditory system of the human body through the oral cavity and/or the teeth of the human body.

25 Claims, 5 Drawing Sheets

(51) Int. Cl.
*H04R 1/24* (2006.01)
*H04R 3/00* (2006.01)
*H04R 7/04* (2006.01)
*H04R 9/02* (2006.01)
*H04R 9/06* (2006.01)
*H04R 17/00* (2006.01)
*H04R 23/02* (2006.01)

(56) References Cited

U.S. PATENT DOCUMENTS

2019/0028820 A1  1/2019  Jurkiewicz
2020/0383468 A1* 12/2020  Ikeda ............... A61C 17/34
2021/0307499 A1* 10/2021  Inagaki ............. A61C 17/20

FOREIGN PATENT DOCUMENTS

| | | |
|---|---|---|
| CN | 105101020 A | 11/2015 |
| CN | 110300346 A | 1/2019 |
| EP | 3484180 A1 | 5/2019 |
| JP | 2013541264 A | 11/2013 |
| JP | 2015186130 A | 10/2015 |
| JP | 2020018827 A | 2/2020 |
| WO | WO2009144964 A1 | 10/2011 |
| WO | WO2014142029 A1 | 9/2014 |
| WO | WO-2020100689 A1 * | 5/2020 ........... A46B 13/023 |

OTHER PUBLICATIONS

International Search Report of PCT/CN2020/093922.
First Office Action of the parallel application JP2022-526455.
First Office Action of the counterpart application CN202080024331.2.

* cited by examiner

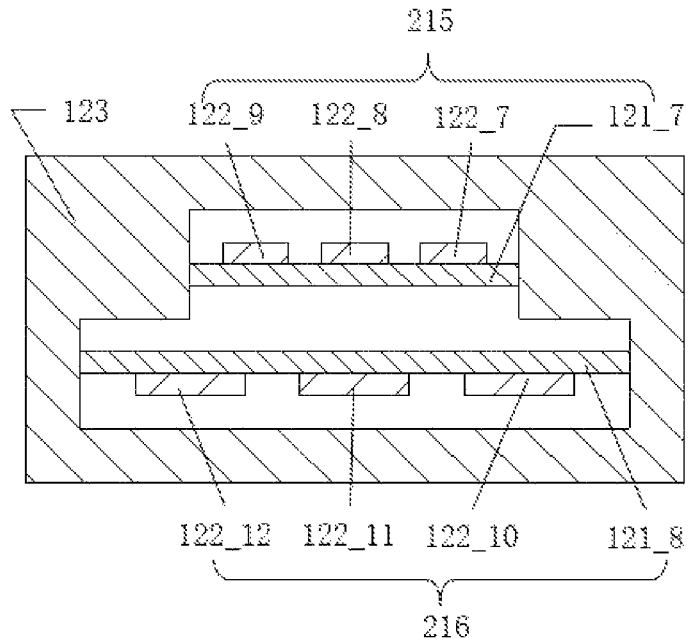

FIG. 2h

| The controller determines whether the functional structure touches the oral cavity or the teeth of the object to which a sound is to be transmitted. | ~ S301 |

↓

| Upon a determination that the functional structure touches the oral cavity or the teeth of the object to which a sound is to be transmitted, the controller drives the sound generating structure to generate a vibration signal, so as to transmit, through the oral cavity or the teeth, the vibration signal to the auditory system of the object to which a sound is to be transmitted | ~ S302 |

FIG. 3

INTEGRATED BONE CONDUCTION SOUND GENERATING DEVICE AND METHOD

CROSS-REFERENCE TO RELATED APPLICATIONS

This application is a continuation of International Application No. PCT/CN2020/093922, filed on Jun. 2, 2020, the disclosure of which is hereby incorporated by reference in its entirety.

TECHNICAL FIELD

The present application relates to the field of bone conduction technology and, in particular, to an integrated bone conduction sound generating device and method.

BACKGROUND

Because the essence of sound waves is vibration, all sources that can be perceived by people or other creatures as sound are mechanical vibrations. Bone conduction sound generating generally refers to the technology that a sound signal is directly transmitted to the auditory system of people or other creatures through biological tissues such as skin tissues, muscle tissues, teeth, bones, etc. by vibration, without transmitting sound waves through the air, so that the auditory system can receive the vibration signal and perceive it as sound.

When the existing bone conduction sound generating device is used, it usually needs to be clipped behind the ear, on the cheek or on the forehead, etc., to transmit the vibration to the skin tissue, muscle tissue, bone, and to the auditory system sequentially. This way of wearing is not convenient for users to fix the position of the bone conduction sound generating device when in use, and it has a certain sense of pressure. Compared with the air conduction device, that is, the general air sound wave conduction earphone, the existing bone conduction sound generating device has some defects, such as low output volume, narrow frequency domain range for sound, high degree of sound distortion, large attenuation of low frequency and high frequency, high power consumption, etc.

The air conduction device will also be distorted and attenuated in a specific frequency domain. In application scenarios such as cinemas, theaters, and home audio devices, which require high sound quality, there is often a large installation space, and several audios with different types can be used in cooperation to solve the distortion and attenuation problems. However, because of the narrow frequency domain of the traditional bone conduction sound generating device, if multiple bone conduction sound generating devices are directly used to solve the distortion and attenuation problems, the number, volume and weight of the required devices will be greatly increased. However, when the bone conduction device is used, the space where it is used is severely restricted because it needs to be attached to the body surface of the organism or directly contacted with the organism, and its own weight and volume can't be too large, which makes it impossible to use multiple bone conduction devices to improve the sound quality under actual conditions.

SUMMARY

The technical problem to be solved by the disclosure is how to solve the problem that the traditional bone conduction sound generating device cannot improve the sound quality by increasing the number of devices due to the limitation of the use space.

The disclosure provides an integrated bone conduction sound generating device, which integrates a sound generating structure, a controller and a functional structure for sound transmission, and can be placed in the oral cavity of the human body for use, thus achieving the effect that the sound quality obtained is similar to the sound quality obtained by increasing the number of devices, but a volume increase is far less than the volume increase through increasing the number of devices.

In a first aspect, the present disclosure provides an integrated bone conduction sound generating device, including: a controller, a sound generating structure and a functional structure;

where the sound generating structure is connected with the controller, and when driven by the controller, is configured to generate a vibration signal; and the functional structure is connected with the sound generating structure, and when touching the oral cavity or the teeth of an object to which a sound is to be transmitted, is configured to transmit through the oral cavity or the teeth the vibration signal to the auditory system of the object to which a sound is to be transmitted.

In a possible design, the sound generating structure includes an external structure and at least one energy conversion unit accommodated in the external structure.

In a possible design, the energy conversion unit includes a power receiving element connected with the external structure, and a vibrating element within an action range of the power receiving element.

Optionally, when there is at least one energy conversion unit:

the power receiving element in each energy conversion unit includes one first magnet body, and the vibrating element includes one second magnet body or two second magnet bodies;

or, the power receiving element in each energy conversion unit includes two first magnet bodies, and the vibrating element includes one second magnet body.

Furthermore, in a possible design, the first magnet body or the second magnet body includes at least one magnet and/or at least one coil.

In a possible design, the energy conversion unit further includes an elastic element configured to effectuate connection between the external structure and the vibrating element.

In a possible design, when there is at least one energy conversion unit, the power receiving element of each energy conversion unit includes a vibrating membrane, and the vibrating element includes at least one piezoelectric sheet.

Optionally, for each energy conversion unit, one piezoelectric sheet is attached to the middle of the vibrating membrane, and other piezoelectric sheets are attached to the side edges of the vibrating membrane respectively.

In a possible design, when there are at least two energy conversion units, the external structure is further provided with at least two accommodating cavities, so that each of the accommodating cavities accommodates one energy conversion unit.

In a possible design, the controller is specifically configured to drive all or part of the energy conversion units in the sound generating structure to generate the vibration signal, according to an acquired sound source type and a corresponding frequency response range of the energy conversion units.

Optionally, each of the energy conversion units corresponds to a different frequency response range.

Optionally, each of the energy conversion units includes at least one different frequency response range.

In a possible design, the functional structure includes at least one of the following categories: dentures, dental appliances, pacifiers, grinding bars, chopsticks, spoons, forks, stirring bars, straws, pens, recording pens, popsicle shafts, toothbrushes, lollipop shafts, electronic cigarettes and cigarette holders.

In a possible design, the functional structure includes at least two independent components, and adjacent independent components are detachably connected to each other.

Optionally, adjacent independent components are connected by at least one of snap connection, pin hole bayonet connection, magnetic connection, chute connection, elastic clasping connection, threaded connection and clamping connection.

Optionally, the controller and the sound generating structure are respectively arranged on different independent components.

Optionally, the independent component provided with the sound generating structure further includes at least one of the following categories: dentures, dental appliances, pacifiers, grinding bars, chopsticks, spoons, forks, stirring bars, straws, pens, recording pens, popsicle shafts, toothbrushes, lollipop shafts, electronic cigarettes and cigarette holders.

In a possible design, the sound generating structure of the integrated bone conduction sound generating device described above in any item is encapsulated inside the functional structure.

In a possible design, the integrated bone conduction sound generating device described above in any item further includes at least one connecting structure configured to connect the sound generating structure and the functional structure.

In a possible design, the integrated bone conduction sound generating device described above in any item further includes a switch component;
then the controller is specifically configured to drive the sound generating structure to generate the vibration signal, when it is determined that the switch component is turned on.

In a possible design, the integrated bone conduction sound generating device described above in any item further includes a power supply unit configured to supply power to the controller and the sound generating structure.

In a possible design, the integrated bone conduction sound generating device described above in any item further includes at least one indicating light;
then the controller is specifically configured to start the at least one indicating light while the controller drives the sound generating structure to generate the vibration signal.

In a possible design, the integrated bone conduction sound generating device described above in any item further includes at least one light emitting device;
then the controller is specifically configured to trigger the at least one light emitting device to emit light with color and/or light intensity according to the type of a sound source and/or the strength of the vibration signal.

In a possible design, the integrated bone conduction sound generating device described above in any item further includes a memory configured to store a sound source.

In a possible design, the integrated bone conduction sound generating device described above in any item further includes a data input interface for receiving a sound source sent by an external device in a wired and/or wireless way.

Optionally, the data input interface includes at least one of a USB interface, an eSATA interface, an SD card interface, a Micro SD card interface, an audio input interface, a video input interface, a Wi-Fi interface, a Bluetooth interface, a metal electrode and a microphone.

In a second aspect, the present disclosure provides an integrated bone conduction sound generating method applied to the integrated bone conduction sound generating device described above in any item of the first aspect, and the method includes:
determining, by the controller, whether the functional structure touches the oral cavity or the teeth of the object to which a sound is to be transmitted;
upon a determination that the functional structure touches the oral cavity or the teeth of the object to which a sound is to be transmitted, driving, by the controller, the sound generating structure to generate a vibration signal, so as to transmit, through the oral cavity or the teeth, the vibration signal to the auditory system of the object to which a sound is to be transmitted.

Optionally, the driving the sound generating structure to generate the vibration signal includes:
driving all or part of the energy conversion units in the sound generating structure to generate the vibration signal, according to an acquired sound source type and a corresponding frequency response range of the energy conversion units.

The disclosure provides an integrated bone conduction sound generating device and method. The device includes a controller, a sound generating structure and a functional structure, and the three components are integrated together. The functional structure can touch the oral cavity and/or the teeth of the human body, and after the controller drives and triggers the sound generating structure to generate a vibration signal, the functional structure can transmit the vibration signal to the auditory system of the human body through the oral cavity and/or the teeth of the human body. Compared with the bone conduction sound generating device in the prior art, there is no feeling of inconvenience and pressure in wearing, and the encapsulating shell of the traditional sound generating structure is cancelled or reduced due to integration, thus the present bone conduction sound generating device has a simple structure and a high degree of integration, thereby achieving the miniaturization of the bone conduction sound generating device and reducing the sound quality loss of the device.

BRIEF DESCRIPTION OF DRAWINGS

In order to more clearly explain the embodiments of the present disclosure or the technical solutions in the prior art, the following will briefly introduce the drawings that need to be used in the description of the embodiments or the prior art. Obviously, the drawings in the following description are intended for some embodiments of the present disclosure. For those of ordinary skill in the art, other drawings can be obtained according to these drawings on the premise of no creative labor.

FIGS. 2a-2h are schematic diagrams of various implementations of the energy conversion unit in the sound generating structure of the integrated bone conduction sound generating device according to another embodiment of the present disclosure.

FIG. 3 is a schematic flowchart of an integrated bone conduction sound generating device method according to yet another embodiment of the present disclosure.

Figure 1:
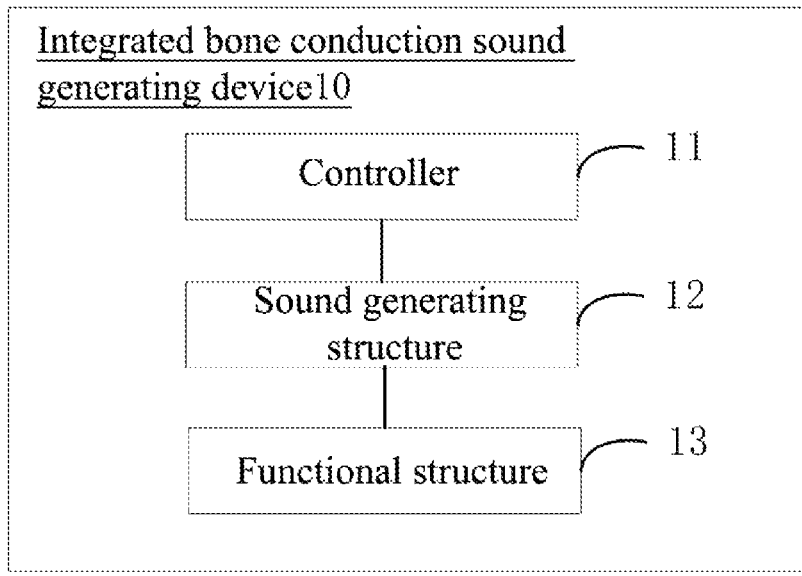
FIG. 1 is a schematic structural diagram of an integrated bone conduction sound generating device according to an embodiment of the present disclosure.

Through the above drawings, specific embodiments of the present disclosure have been shown, which will be described in more detail later. These drawings and literal descriptions are not intended to limit the scope of the inventive concept in any way, but to explain the inventive concept to those skilled in the art with reference to specific embodiments.

DETAILED DESCRIPTION OF EMBODIMENTS

In order to make the objective, technical scheme and advantages of the embodiments of the present disclosure clearer, the technical scheme in the embodiments of the present disclosure will be clearly and completely described below with reference to the drawings in the embodiments of the present disclosure. Obviously, the described embodiments are a part of the embodiments of the present disclosure, but not all the embodiments. Based on the embodiments of the present disclosure, all other embodiments obtained by ordinary technicians in the field without creative labor shall fall into the scope of protection of the present disclosure.

Terms such as "first", "second", 'third", "fourth" and the like (if any) in the specification and the claims as well as the described accompany drawings of the present disclosure are used to distinguish similar objects, but not intended to describe a specific order or sequence. It will be appreciated that the data used in this way is exchangeable under appropriate circumstances, so that the embodiments of the present disclosure described herein can be implemented in an order other than those illustrated or described herein, for example. Moreover, terms such as "include" and "have" and any variation thereof are intended to cover a non-exclusive inclusion, e.g., processes, methods, systems, products or devices that contain a series of steps or units are not necessarily limited to those steps or units that are clearly listed, but may include other steps or units that are not explicitly listed or inherent to these processes, methods, products or devices.

The technical scheme of the present disclosure and how the technical scheme of the present application can solve the above technical problems will be explained in detail with specific examples below. The following specific embodiments can be combined with each other, and the same or similar concepts or processes may not be described in detail in some embodiments. Embodiments of the present disclosure will be described below with reference to the drawings.

In the prior art, the bone conduction sound generating device usually needs to be clipped behind the ear or on other parts when in use, so as to transmit the vibration to the skin tissue, muscle tissue, bone, and to the auditory system sequentially. However, this way of wearing is not convenient for the user to fix the position of the bone conduction sound generating device when using it, and in order to ensure certain sound quality, the bone conduction sound generating device needs to be closely attached to the attached part, which brings a certain pressure to the user when using it.

In addition, more importantly, the bone conduction sound generating device in the prior art still have defects such as narrow frequency domain, which leads to the problem of poor sound quality. Although the sound quality can be improved by setting a plurality of bone conduction sound generating devices, the number, volume and weight of the required devices will be greatly increased, which will further lead to inconvenience and pressure in wearing. In addition, especially when the bone conduction device is worn behind the user's ear, it will be limited by the use space, that is, the sound quality cannot be improved by increasing the number of devices.

Based on the above technical problem, the present disclosure provides an integrated bone conduction sound generating device mainly including a controller, a sound generating structure and a functional structure, and the three components are integrated together. The functional structure can touch the oral cavity or the teeth of the human body, and after the controller drives the sound generating structure to generate a vibration signal, the functional structure can transmit the vibration signal to the auditory system of the human body through the oral cavity or the teeth of the human body. Compared with the bone conduction sound generating device in the prior art, there is no feeling of inconvenience and pressure in wearing, and also there are technical effects that the structure is simple, the integration is of a high degree, and the sound quality is improved to a certain extent.

FIG. 1 is a schematic structural diagram of an integrated bone conduction sound generating device according to an embodiment of the present disclosure, as illustrated in FIG. 1, the integrated bone conduction sound generating device 10 provided in the present embodiment includes: a controller 11, a sound generating structure 12 and a functional structure 13.

In the embodiment, the sound generating structure 12 is connected with the controller 11, and when driven by the controller 11, is configured to generate a vibration signal; and the functional structure 13 is connected with the sound generating structure 12, and when touching the oral cavity or the teeth of an object to which a sound is to be transmitted, is configured to transmit, through the oral cavity or the teeth, the vibration signal to the auditory system of the object to which a sound is to be transmitted.

In the embodiment, the object to which a sound is to be transmitted is applied in the integrated bone conduction sound generating device, and can be not only a person, but also an animal, such as a cat or a dog. In the present embodiment and subsequent embodiments, the application of the integrated bone conduction sound generating device to people will be taken as an example for detailed explanation.

Optionally, the sound generating structure 12 and the controller 11 are independent units, which can be connected by wires to realize that the controller 11 transmits a control signal to the sound generating structure 12 in the form of electrical signal.

Optionally, the sound generating structure 12 and the controller 11 can be directly connected by a mechanical structure, for example, in the form of connector, and two corresponding insertion structures of the connector are respectively arranged on the sound generating structure 12 and the controller 11.

Alternatively, the sound generating structure 12 is directly connected with the controller 11 through the clamping and positioning structure, and the specific connection form is not limited in the embodiment. The skilled person can decide the connection form according to the actual situation, and any way that can realize the connection falls within the scope of the description of the embodiment.

In addition, in the embodiment, the user can place the functional structure 13 in the bone conduction sound generating device inside the oral cavity until touching the internal tissues of the oral cavity. Specifically, the user can hold the functional structure 13 with his mouth, bite the functional structure 13, or press the functional structure 13 against one side of the oral cavity, e.g., against the upper jaw or the tongue or the left and right cheek sides in the oral cavity, and then when the controller 11 drives the sound generating structure 12 to generate a vibration signal, the functional structure 13 can transmit the vibration signal to the auditory system by means of bone conduction.

It should also be noted that when the teeth are buck teeth or the like, the controller 11 can also drive the sound generating structure 12 to generate a vibration signal when the functional structure 13 in the bone conduction sound generating device touches the teeth without entering the oral cavity, and then the functional structure 13 can transmit the vibration signal to the auditory system by means of bone conduction.

It should also be noted that the difference between the sound generating structure 12 in the embodiment and the sound generating structure in the traditional bone conduction sound generating device lies in that the traditional sound generating structure has a shell which plays a role of encapsulation. The existing technical means to improve the sound quality of the bone conduction sound generating device is to increase the number of sound generating structures in different frequency domains, but the traditional sound generating structure is individually encapsulated, which makes the volume and weight of the shell geometrically increase and the production cost correspondingly increase. Moreover, since the encapsulated shell will increase the transmission distance of vibration, the vibration signal will be attenuated, that is, the sound is subject to the sound quality loss.

The sound generating structure 12 described in the present embodiment contains related actuators that can generate vibration. In practice, through creative exploration, the inventors of the present application found that the sound generating structure 12 can be encapsulated in a way that a plurality of vibration actuators are integrated together for encapsulation, or it's encapsulation relies on the functional structure 13, that is, the sound generating structure 12 is embedded in the functional structure 13, or the sound generating structure 12 is wrapped by the functional structure 13. The encapsulation of the sound generating structure 12 can also be shared with the controller 11, that is, the sound generating structure 12 is integrated with the controller 11. The encapsulation of the sound generating structure 12 can also be integrated with the controller 11 and the functional structure 13 as an encapsulation.

Based on this, through such integration, it is possible to reduce or even cancel the encapsulating shell of the sound generating structure, reduce the volume and weight of the device, avoid that the volume of the bone conduction sound generating device is doubled with the increase in components of the sound generating structure to improve the sound quality, and achieve a significant reduction in the production cost of the bone conduction device. With the reduction of the encapsulating shell of the sound generating structure, the sound quality loss caused by the shell can also be mitigated.

The integrated bone conduction sound generating device provided in the present embodiment includes a controller, a sound generating structure and a functional structure, and the three components are integrated together. The functional structure can touch the oral cavity or the teeth of the human body, and after the controller drives the sound generating structure to generate a vibration signal, the functional structure can transmit the vibration signal to the auditory system of the human body through the oral cavity or the teeth of the human body. Compared with the bone conduction sound generating device in the prior art, there is no feeling of inconvenience and pressure when wearing, and because of the integration, the encapsulating shell of the traditional sound generating structure is cancelled or reduced, thus the present bone conduction sound generating device has a simple structure and a high degree of integration, thereby achieving the miniaturization of the bone conduction sound generating device and reducing the sound quality loss of the device.

Furthermore, on the basis of the above embodiments, in another embodiment of the present disclosure, the controller 11 may further include a memory, in which sound information may be stored in advance; and the controller 11 converts the pre-stored sound information into a corresponding electrical signal for transmission to the corresponding sound generating structure 12. The memory can be any device suitable for storing information and facilitating the control system to obtain information, including a semiconductor memory, a magnetic surface memory, or the like.

Optionally, the controller 11 may further include a data input interface, which is used to receive the sound information sent by the external device in a wired and/or wireless way. The control system may convert the sound information sent by the external device into a corresponding electrical signal and transmit it to the corresponding sound generating structure 12 to drive the sound generating structure 12 to vibrate.

The data input interface includes a USB interface, an eSATA interface, an SD card interface, a Micro SD card interface, an audio input interface, a video input interface, a Wi-Fi interface, a Bluetooth interface, a metal electrode, a microphone and other interface suitable for receiving electrical signals, radio waves, magnetic signals, optical signals and the like containing sound information.

That is, the controller 11 can convert the sound information stored in the memory or acquired from the data input interface into a corresponding electrical signal to drive the sound generating structure 12.

Optionally, the sound generating structure 12 can vibrate in various ways. In the process of converting the electric signal sent by the controller 11 into a vibration signal, the energy existing in the sound generating structure 12 can be in various forms, including magnetic field energy, thermal energy, mechanical energy, etc. The sound generating structure 12 can be various components that can cooperate with each other to convert an electrical signal containing sound information into a corresponding vibration signal.

FIGS. 2a-2h are schematic diagrams of various implementations of the energy conversion unit in the sound generating structure of the integrated bone conduction sound generating device according to another embodiment of the present disclosure. On the basis of any of the above embodiments, the sound generating structure 12 of the embodiment of the present disclosure includes an external structure 123 and at least one energy conversion unit 21 accommodated in the external structure. The energy conversion unit 21 includes a power receiving element 122 connected to the external structure, and a vibrating element 121 within the action range of the power receiving element.

Figure 2A:
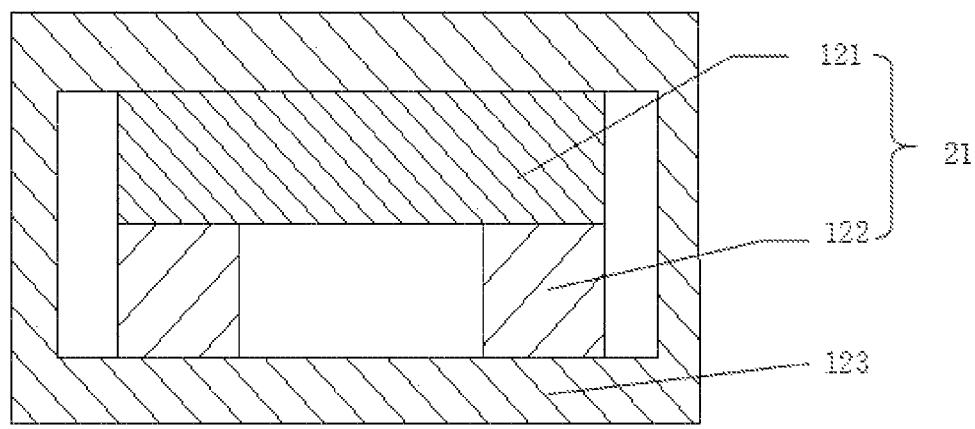

The energy conversion unit in the present embodiment can be implemented in a variety of ways, specifically described as follows:

FIG. 2a is an implementation of the energy conversion unit in the present embodiment, as shown in FIG. 2a: the vibrating element 121 can be a magnet, and the power receiving element 122 can be a coil.

In the present embodiment, the magnet 121 and the coil 122 can form one energy conversion unit 21. In the present embodiment, the energy conversion unit 21 serves to convert electric energy into magnetic field through the coil 122, and the energized coil 122 generates the magnetic field for magnetic action with the magnet 121, so that the magnet 121 exerts pressure on the external structure 123 through mechanical connection to deform the external structure 123. The electric signal adjusts the strength of the magnetic field to change the deformation degree accordingly, which makes the external structure 123 vibrate together with the magnet, so that the electric signal sent by the controller 11 is converted into a vibration signal carrying sound information, that is, sound generation by vibration is realized.

It can be understood that the implementation of the external structure 123 is similar to the description in the encapsulating implementation of the sound generating structure 12, where a functional structure, or a shell of the controller, or a mechanical structure composed of the functional structure and the controller can be used as an encapsulating cavity. For detailed description, please refer to the encapsulating implementation of the sound generating structure 12 mentioned above, which will not be repeated here. The specific form of the external structure 123 is not limited in the present application.

It is worth noting that the magnet 121 of the present embodiment may also be a magnet body composed of a coil or a magnet body composed of a coil and a magnet together. Similarly, the coil 122 can also be a magnet body composed of a coil and/or a magnet. In the present application, the magnet body refers to a component or a structural module capable of generating magnetic field. Similar implementations may exist in the magnet and the coil mentioned in the following embodiments, which are explained here and will not be described in detail below. The specific form of the magnet body is not limited in the disclosure, and all components that can generate magnetic field fall within the scope of the magnet body described in the disclosure.

It should also be noted that the bone conduction sound generating device mentioned in various embodiments of the present disclosure can be used not only for people, but also for other animals, and the present disclosure does not impose limitation to users.

Figure 2B:
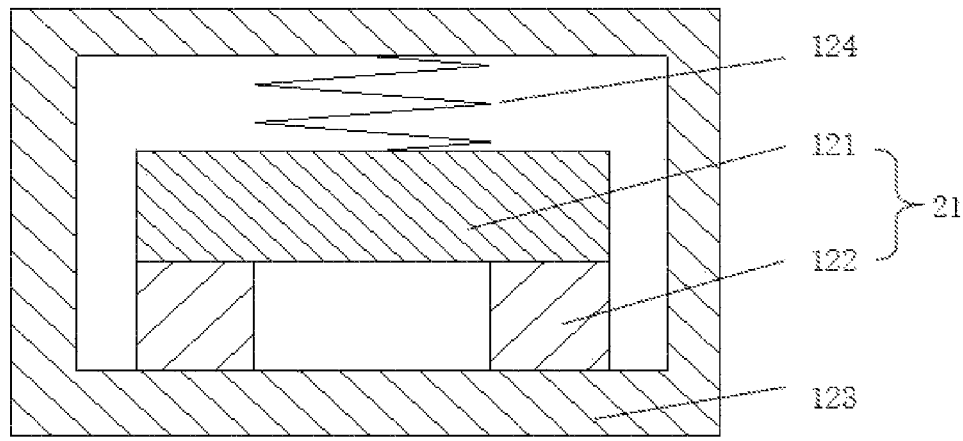

On the basis of the embodiment of the energy conversion unit shown in FIG. 2a, FIG. 2b is another implementation of the energy conversion unit in the present embodiment. As shown in FIG. 2b, the magnet 121 is connected with the external structure 123 through an elastic element 124. The elastic element 124 can be a spring, rubber or other elastic materials.

In addition, it should be noted that, for the energy conversion unit 21 of the sound generating structure 12, a single group or a plurality of groups of energy conversion units may form a whole sound generating actuator, and different energy conversion units have corresponding different vibration frequency domains, for example, some energy conversion units are used to realize a high sound frequency domain, some energy conversion units are used to realize a middle sound frequency domain, and others are used to realize a low sound frequency domain.

Optionally, the energy conversion unit 21 may include a plurality of power receiving elements and a plurality of vibrating elements. In a possible implementation, the number of power receiving elements is the same as the number of vibrating elements, and the power receiving elements correspond to the vibrating elements one by one, and each power receiving element is electrically connected with the controller, and the controller drives, according to a frequency band characteristic of sound information, a corresponding vibrating element to vibrate, thereby forming multiple groups of energy conversion units.

Figure 2C:
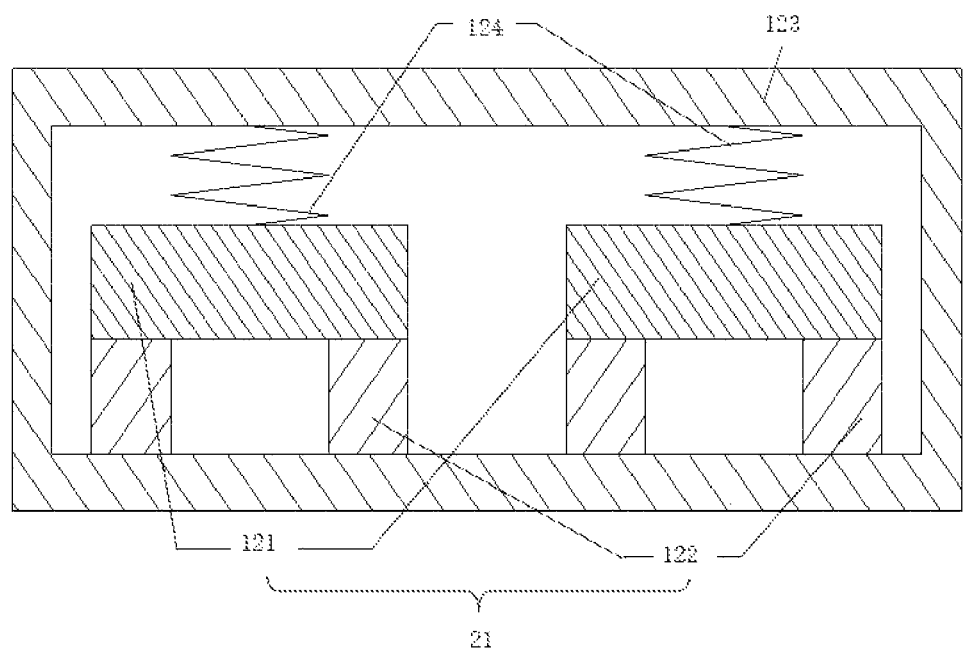

Based on this, FIG. 2c is another implementation of the energy conversion unit in the present embodiment. As shown in FIG. 2c, the sound generating structure 12 includes two power receiving elements (e.g., coils) 122 and two vibrating elements (e.g., magnets) 121, forming two groups of energy conversion units 21.

The frequency response characteristics of multiple groups of energy conversion units can be different, and the controller 11 can drive, according to a frequency band characteristic of sound information, one group and/or several groups of energy conversion units corresponding to the frequency response characteristic(s) to vibrate. Specifically, the controller 11 sends corresponding electrical signals to one group and/or several groups of energy conversion units with the highest degree of matching between the resonance peak frequency of the vibrating element and the frequency band characteristic of the sound information, so that one or several groups of energy conversion units are responsible for realizing the sound effect of high frequency band and the other group or groups are responsible for realizing the sound effect of the low frequency band. Because different energy conversion units are adopted, and the structure is relatively simple and the integration level is high, there is no more demand for space, and more frequency domains can be further provided, that is, the sound quality is improved.

It can be understood that the power receiving element and the vibrating element are not limited to the coil and the magnet in terms of specific form, but there may also be other forms.

Figure 2D:
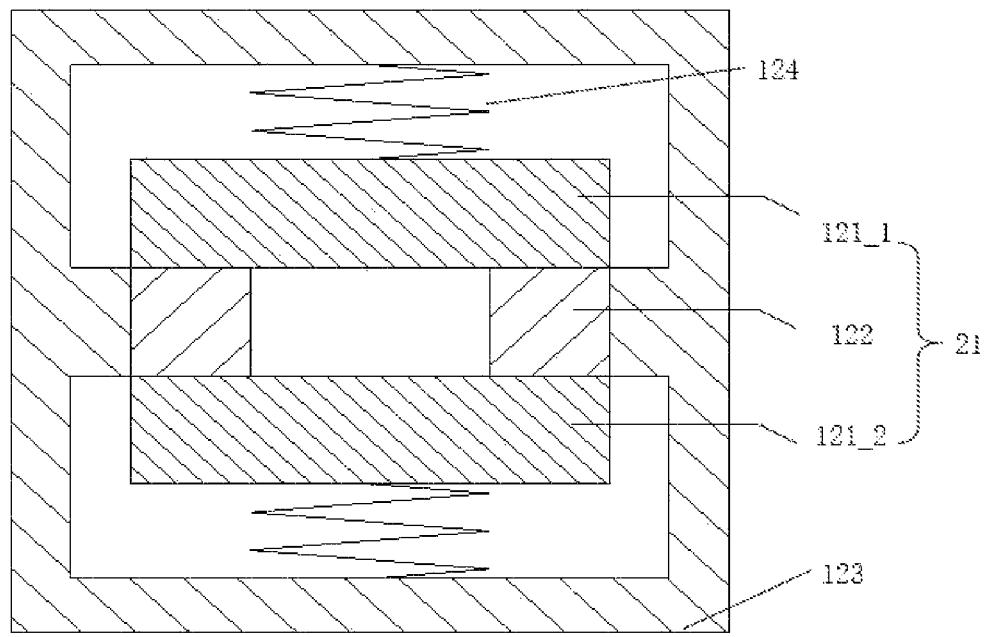

FIG. 2d is another implementation of the energy conversion unit in the present embodiment. As shown in FIG. 2d, each energy conversion unit includes at least two vibrating elements 121, and the two vibrating elements share a power receiving element 122. The power receiving element 122 is a coil, and the vibrating elements 121 are magnets 121_1 and 121_2, and the two magnets 121_1 and 121_2 are arranged on opposite sides of the coil 122. And the two magnets 121_1 and 121_2 are both within the effective range of the magnetic field generated by the coil 122, that is, the coil 122 can drive both the magnet 121_1 and the magnet 121_2. The magnet 121_1 is responsible for realizing the vibration in the high frequency band and the magnet 121_2 is responsible for realizing the vibration in the low frequency band.

It can be understood that the two magnets 121_1 and 121_2 may have different parameters such as weight, size, material and magnetic air gap with the coil 122, so that the two parts of the energy conversion unit 21 have different frequency response characteristics.

Optionally, the power receiving element, i.e., the coil 122, and the two vibrating elements, i.e., the two magnets 121_1 and 121_2, in the embodiment of the present application can be arranged coaxially, so as to facilitate the driving of the magnets 121_1 and 121_2 in a balanced manner; they can also be arranged non-coaxially, and different frequency characteristics can be realized by adjusting the relative positions, materials, magnetic air gaps, turns and different electric control signals between the two magnets and the coil, and by mutual cooperation between multiple magnets and coils.

It can be understood that, in the embodiment of the present disclosure, the structure composed of each magnet and the coil can have a specific frequency range, so if there are multiple combinations of magnets and coils in one energy conversion unit, a single energy conversion unit can achieve the function of having multiple different frequency ranges.

When the controller 11 sends an electrical signal to the coil 122, the two magnets 121_1 and 121_2 are driven to vibrate, so that the vibration signal output by the bone conduction sound generating device comes from the superposition effect of two groups of sound frequency bands, which can improve the sound quality of the bone conduction sound generating device, that is, broaden the frequency domain of sound frequency. At the same time, such integration can greatly reduce the overall volume of the bone conduction sound generating device.

Figure 2E:
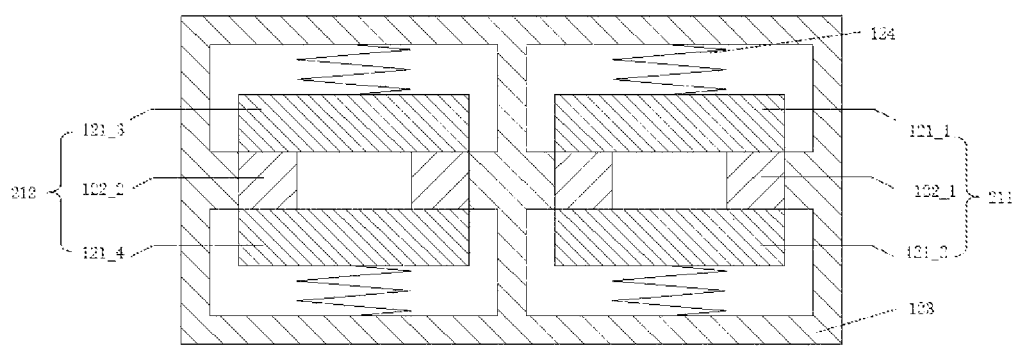

In addition, when there are at least two energy conversion units, all the energy conversion units can share an accommodating cavity composed of an external structure 123, as shown in above FIG. 2c; alternatively, each energy conversion unit is individually encapsulated by an accommodating cavity, that is, the external structure 123 can be divided into accommodating cavities corresponding to the number of energy conversion units, that is, FIG. 2e is another implementation of the energy conversion unit in the present embodiment. As shown in FIG. 2e, the sound generating structure includes an energy conversion unit 211 and an energy conversion unit 212. The energy conversion unit 211 is composed of: two magnets 121_1 and 121_2; and a coil 122_1. The energy conversion unit 212 is composed of: two magnets 121_3 and 121_4; and a coil 122_2. The two energy conversion units 211 and 212 are respectively accommodated by two accommodating cavities formed by the external structure 123. The two energy conversion units 211 and 212 can have different frequency response characteristics, so as to further broaden the frequency response range of the bone conduction sound generating device and improve the sound quality.

Optionally, further, when there are a plurality of energy conversion units, a part of energy conversion units may share an accommodating cavity and the other part of energy conversion units may use separate accommodating cavities, which forms the sound generating structure with such a combination.

In addition, for each energy conversion unit, in a possible implementation, each energy conversion unit includes at least two power receiving elements, and the two power receiving elements share a vibrating element, which can reduce the overall volume of the bone conduction sound generating device.

Figure 2F:
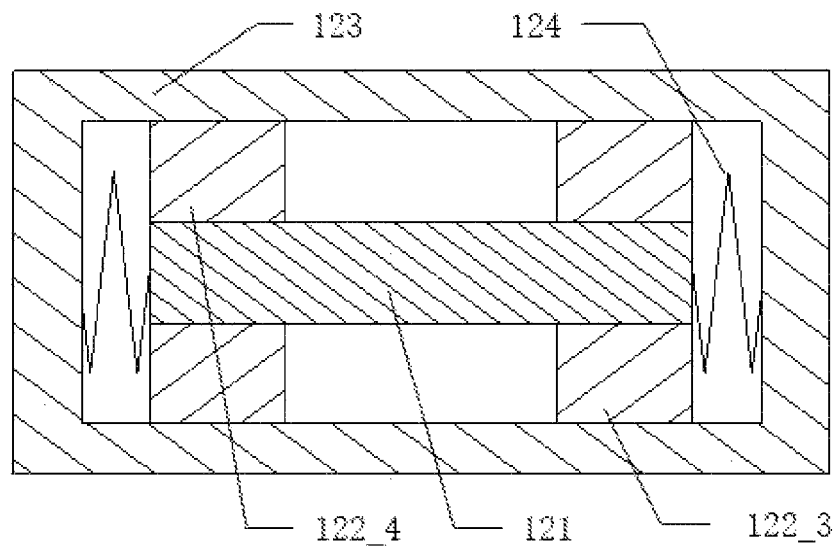

FIG. 2f is another implementation of the energy conversion unit in the present embodiment. As shown in FIG. 2f, the sound generating structure includes two coils 122_3 and 122_4, a magnet 121, an elastic element 124 and an external structure 123. The magnet 121 is within the effective range of the magnetic fields generated by the two coils 122_3 and 122_4, that is, the magnet 121 can be driven by both the coil 122_3 and the coil 122_4, thus forming the energy conversion unit. As shown in FIG. 2f, two coils 122_3 and 122_4 are arranged at opposite ends of the magnet 121.

In a possible design, the two coils 122_3 and 122_4 can also be arranged on the same side of the magnet 121.

Optionally, the vibrating element, that is, the magnet 121, and the two power receiving elements, that is, the two coils 122_3 and 122_4, in the embodiment of the present application can be arranged coaxially, so as to facilitate the driving of the magnet 121 in a balanced manner. They can also be arranged non-coaxially, and different frequency characteristics can be realized by adjusting the relative positions, materials, magnetic air gaps, turns and different electric control signals between the two coils and the magnet, and by mutual cooperation between multiple coils and magnets.

It should be noted that the number of turns, materials and magnetic air gaps between the two coils 122_3 and 122_4 and the magnet 121 can be different, so that the energy conversion unit can have different frequency response characteristics.

Based on this, according to the frequency band characteristic of the sound information, the controller can send an electric signal to one of the coils to drive the magnet 121 to vibrate, or send mutually matched electric signals to the two coils at the same time to drive the magnet 121 to vibrate under the superimposition influence from the magnetic field of the two coils. Specifically, the controller can send corresponding electrical signals to a group of energy conversion units with the highest degree of matching between the resonance peak frequency of energy conversion unit and the frequency band characteristic of the sound information.

This integrated structure can also greatly reduce the volume and weight of the sound generating structure, thus reducing the volume and weight of the bone conduction device, reducing the cost, and widening the sound frequency domain, thus improving the sound quality.

Figure 2G:
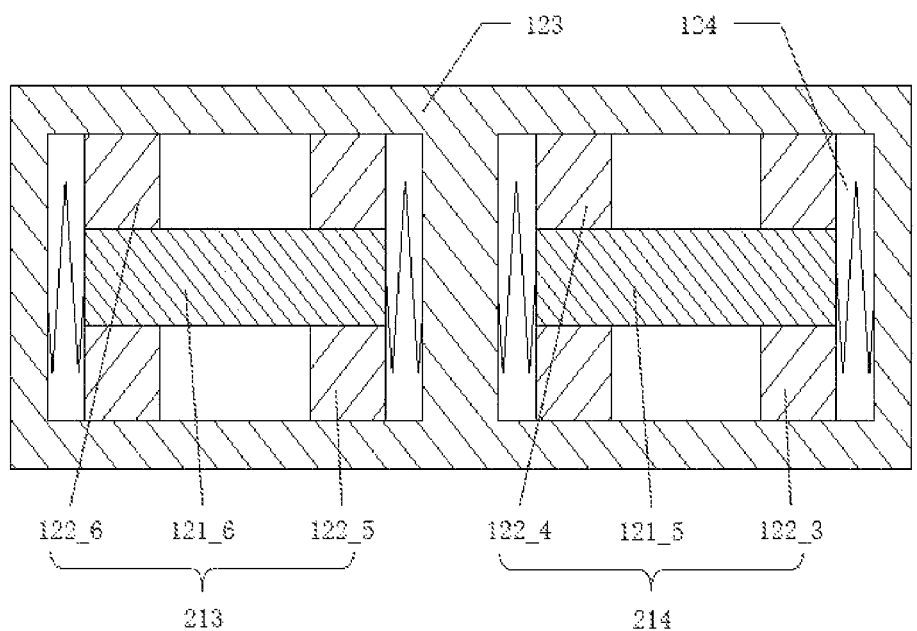

Furthermore, optionally, FIG. 2g is another implementation of the energy conversion unit in the present embodiment, and the sound generating structure includes at least two energy conversion units shown in FIG. 2f. All energy conversion units can share one accommodating cavity, or each energy conversion unit can have a single accommodating cavity, or there may be a combination of the above two accommodating ways, that is, several energy conversion units share the accommodating cavity, and others can have independent accommodating cavities. As shown in FIG. 2g, the sound generating structure includes two groups of energy conversion units, namely energy conversion units 213 and 214. The two magnets 121_5 and 121_6 in FIG. 2g can have different weights, materials, sizes and magnetic air gaps with respective coils, and the four coils 122_3, 122_4, 122_5 and 122_6 can also have different turns and materials. Therefore, the sound generating structure can have four different frequency response characteristics, thus further widening the frequency response range of the sound generating module and improving the sound quality.

It should be noted that, in the above embodiments, the energy conversion unit may also include at least one elastic structure or the elastic element 124 is connected with the external structure 123 to transmit the vibration signal generated by the vibrating element to the external structure 123. The elastic element 124 or elastic structure includes a spring, a rubber block, etc. The frequency response characteristic of the corresponding energy conversion unit can be adjusted by adjusting the specific form, structure, material and other parameters of the elastic element 124 or elastic structure.

As for the sound generating structure, there are other ways to realize the power receiving element and the vibrating element. FIG. 2h is another way to realize the energy conversion unit in the present embodiment. As shown in FIG. 2h, the sound generating structure includes two vibrating elements, namely, vibrating membranes 121_7 and 121_8, and six power receiving elements, namely piezoelectric sheets 122_7 to 122_12. The external structure 123 forms an accommodating cavity to enclose the vibrating membranes and piezoelectric sheets. The vibrating membranes 121_7 and 121_8 may be positioned in an up-down, side-by-side, or staggered arrangement. Three piezoelectric sheets 122_7 to 122_9 are mechanically connected to different positions on the vibrating membrane 121_7. The piezoelectric sheets can be arranged on the same side of the vibrating membrane or on both sides of the vibrating membrane. For example, one piezoelectric sheet is attached to the middle of the vibrating membrane, and the remaining two piezoelectric sheets are attached to either sides of the vibrating membrane. The distance among the three piezoelectric sheets can be adjusted according to the actual situation, which is not specifically limited in this embodiment.

Similarly, the other three piezoelectric sheets 122_10 to 122_12 are connected to the vibrating membrane 121_8 in a similar way, and a respective one of the two energy conversion units 215 and 216 is composed of three piezoelectric sheets and one vibrating membrane. Vibrating membranes 121_7 and 121_8 can be fixedly connected with the external structure 123. The piezoelectric sheets receive the electric signals from the controller and deform, which drives the vibrating membranes to generate vibration signals. The vibrating membranes conduct the vibration signals to the external structure 123. By changing the model of piezoelectric sheets, the connecting position between piezoelectric sheets and the corresponding vibrating membrane, the size and material of the vibrating membrane, the frequency response characteristics of each group of energy conversion units can be adjusted. The two groups of energy conversion units 215 and 216 in FIG. 2h have six different frequency response characteristics, therefore, the frequency response range of the sound generating module can be further widened, and the sound quality can be further improved.

It should be noted that when there are at least two energy conversion units in the above embodiments, each energy conversion unit may have a corresponding different frequency response range, or some energy conversion units may have the same frequency response range, while others may have different frequency response ranges. According to the acquired sound source types and different frequency response ranges corresponding to energy conversion units, the controller may, under a predetermined control algorithm, output an electric control signal driving all or part of energy conversion units in the sound generating structure to vibrate. The control algorithm is not limited in the present application, which can be selected by the skilled person according to the actual situation.

As for the functional structure 13, its specific implementation forms include dentures, dental appliances, pacifiers, grinding bars, chopsticks, spoons, forks, stirring bars, straws, pens, recording pens, popsicle shafts, toothbrushes, lollipop shafts, e-cigarettes, cigarette holders or other similar products, as well as by-products of the above products, etc., which can be set independently or assembled by several components.

In the present embodiment, the energy conversion unit in the sound generating structure can have the above-mentioned multiple implementations, so as to achieve simple structure, high degree of integration, improvement of sound quality and the like.

Furthermore, on the basis of any of the above embodiments, another embodiment of the present disclosure provides a sound generating structure of an integrated bone conduction sound generating device. The functional structure 13 and the external structure 123 of the sound generating structure may be the same structure, that is, the energy conversion unit 21 does not have an encapsulating shell independent of the functional structure 13, and the energy conversion unit 21 may be directly arranged in the cavity formed by the functional structure 13 and connected with the functional structure 13. In other words, the shell of the energy conversion unit or the sound generating structure can be directly formed into the functional structure 13, so that the functional structure 13 and the sound generating structure 12 can be integrated together.

In a possible design, the functional structure 13 can transmit the vibration signal to the auditory system through the teeth, so as to improve the transmission efficiency of the vibration signal, and reduce the loss of the vibration signal during the transmission. The part of the functional structure 13 that is suitable for entering the mouth should be made of non-toxic materials to avoid harming human health.

In an alternative implementation, the functional structure 13 includes at least two cavities, and the sound generating structure 12 and the controller 11 are arranged in different cavities, so that the energy conversion units of the sound generating structure have relatively independent installation spaces, which can reduce the interference of the energy conversion units from the outside. For example, the cavity where the energy conversion unit is located can be arranged in the part of the functional structure 13 that is suitable for entering the mouth, and the cavity where the controller is located can be far away from the part that is suitable for entering the mouth, so that the vibration signal can be better transmitted to the auditory system and the safety in use can be improved.

In an optional implementation, the functional structure 13 includes at least two cavities, and the sound generating structure 12 includes at least two groups of energy conversion units, and at least two groups of energy conversion units are respectively arranged in different cavities, as shown in FIGS. 2e and 2g. For example, the part of the functional structure 13 that is suitable for entering the mouth has a plurality of branches which can contact with different positions in the oral cavity, and groups of energy conversion units are respectively arranged in the cavities at different branches, so that the transmission effect of vibration signals can be improved.

In a possible design, the functional structure 13 includes at least two independent components, and adjacent independent components are connected in a detachable manner. For example, the functional structure 13 is made into an encapsulating shell of the sound generating structure 12, that is, the functional structure 13 and the sound generating structure 12 form an independent component, and the controller 11 forms another independent component. The two components can be connected by wires or connectors, or connected by wireless devices including Bluetooth, Wi-Fi (Wireless Fidelity), NFC (Near Field Communication), etc., or connected by snap connection, pin hole bayonet connection, magnetic connection, chute connection, elastic clasping connection, threaded connection and clamping connection, and a combination of the above.

Optionally, the independent component on which the sound generating structure 12 is located may also include dentures, dental appliances, pacifiers, grinding bars, chopsticks, spoons, forks, stirring bars, straws, pens, recording pens, popsicle shafts, toothbrushes, lollipop shafts, electronic cigarettes and cigarette holders, etc., which provide other functions.

It should be noted that when the sound generating structure 12 and the functional structure 13 are integrated, a specific connecting structure can be set to connect them. As shown in FIG. 2h, the external structure 123 is the functional structure, and the vibrating membrane is connected with the functional structure through a specific slot.

In addition, the integrated bone conduction sound generating device of the present embodiment may further include a switch component, through which a user can input a switch signal and transmit the signal to the controller. The switch component may be implemented as a button switch, a toggle switch, or a sensor, such as a photosensitive sensor, a temperature sensor, a humidity sensor, a voice control sensor, or a combination of at least two of them. Specifically, when the user puts, into the mouth, the part of the functional structure that is suitable for entering the mouth, the photosensitive sensor detects that there is no light around it, which can be regarded as triggering a turning on instruction. Of course, in order to prevent the misjudgment when holding the device in the hand, temperature and humidity sensors can also be added, since the oral temperature is higher than the body surface temperature and the oral cavity is moist, the user's turning-on and turning-off requirements can be accurately judged through the combination of the three factors, so as to realize automatic turning on and turning off. In response to the turning-on signal sent by the switch, the controller sends an electrical signal to the corresponding one or more groups of energy conversion units.

Optionally, the integrated bone conduction sound generating device of the present embodiment may further include a power supply unit for supplying power to the controller and the sound generating structure, and the power supply unit may be a replaceable dry cell or a button cell, or a solar cell, or a rechargeable battery, or a super capacitor, or a device that can convert mechanical energy into electrical energy through shaking or other movements, for example, a mechanical watch where the mechanical energy is converted into electric energy by shaking the arm and the action of gravity. It can also be a device for converting mechanical energy into electric energy by occlusion, which causes a pressure difference between different parts of a semiconductor material.

Optionally, the integrated bone conduction sound generating device of the present embodiment may further include at least one indicating light for indicating the working state of the bone conduction sound generating device. For example, when the controller drives the sound generating structure to generate a vibration signal, the indicating light lights up to indicate that the sound generating device is working normally. The working state of the bone conduction sound generating device can include the working state of the sound generating structure, the working state of the functional structure and the electric quantity state of the power supply unit. The indicating light can be set at the part of the bone conduction sound generating device that is not suitable for entering the mouth, which is convenient to observe the working condition of the bone conduction sound generating device, and can also provide a decorative function to improve the user's experience.

Optionally, the integrated bone conduction sound generating device of the present embodiment may further include at least one light emitting device. For this light emitting device, when the sound generating structure vibrates to transmit music signals, the color or brightness of the light emitted by the light emitting device is changed by the controller according to the frequency change of the sound source, or a combination of the two is changed, that is, both the color and the brightness of the light are changed. The light emitting device can also directly change the color or brightness of light or a combination of the two according to the strength of the vibration of the sound generating structure. This can increase the gorgeous appearance effect of the bone conduction sound generating device and improve the user's experience. Specifically, the light emitting device can also flash according to a predetermined program. The light emitting device can be arranged at the part of the bone conduction sound generating device that is suitable for entering the mouth or at the part of the bone conduction sound generating device that is not suitable for entering the mouth. The light emitting device can be a light emitting appliance or a light emitting material suitable for being arranged on the bone conduction sound-generating device. Setting the light emitting device can enhance the enjoyment of the bone conduction sound generating device.

In addition, in a possible embodiment, the integrated bone conduction sound generating device may further include a memory, in which sound source data is stored, and the controller transmits a corresponding control signal to the sound generating structure by reading the sound source data in the memory.

Optionally, the integrated bone conduction sound generating device can also include a data input interface providing wired input or wireless input functions, including a USB interface, an eSATA interface, an SD card interface, a Micro SD card interface, an audio input interface, a video input interface, a Wi-Fi interface, a Bluetooth interface, a metal electrode and a microphone, etc.

The integrated bone conduction sound generating device provided in the present embodiment includes a controller, a sound generating structure and a functional structure. The sound generating structure is connected with the controller, and when driven by the controller, is configured to generate a vibration signal; the functional structure is connected with the sound generating structure, and when touching the oral cavity or the teeth of the human body, is configured to transmit the vibration signal to the auditory system of the human body through the oral cavity or the teeth of the human body. By connecting and integrating the sound generating structure and the functional structure, the encapsulating shell of the traditional sound generating structure is cancelled, so that the bone conduction sound generating device has a simple structure and a high degree of integration, thereby achieving the miniaturization of the bone conduction sound generating device and reducing the sound quality loss of the device.

FIG. 3 is a schematic flowchart of an integrated bone conduction sound generating method according to yet another embodiment of the present disclosure. As illustrated in FIG. 3, the method includes the following steps.

S301, the controller determines whether the functional structure touches the oral cavity or the teeth of the object to which a sound is to be transmitted.

In this step, the controller determines, through a detection signal of a sensor or a turning-on or turning-off signal of the switch component, whether the functional structure touches the oral cavity or the teeth of the object to which a sound is to be transmitted.

S302, upon a determination that the functional structure touches the oral cavity or the teeth of the object to which a sound is to be transmitted, the controller drives the sound generating structure to generate a vibration signal, so as to transmit, through the oral cavity or the teeth, the vibration signal to the auditory system of the object to which a sound is to be transmitted.

In the embodiment, the method can be applied to any of the above-mentioned integrated bone conduction sound generating devices, and have similar implementations and technical effects thereto; details will not be repeated here.

In addition, optionally, driving the sound generating structure to generate the vibration signal in S302 has a specific implementation of:

driving all or part of the energy conversion units in the sound generating structure to generate the vibration signal, according to an acquired sound source type and a corresponding frequency response range of the energy conversion units.

In the embodiment, in order to achieve better sound quality, according to the type of a sound source that is played (such as symphony, light music or other type) and the corresponding frequency response range(s) of the energy conversion units, the energy conversion units matched with the type of the sound source can be determined from all energy conversion units in the sound generating structure, and the matched energy conversion units can be driven to generate vibration signals, so as to achieve an effect of playing more suitable sound quality in high conformation to the type of the sound source to the user.

Those skilled in the art will easily think of other embodiments of the disclosure after considering the specification and practicing the disclosure disclosed here. The present disclosure is intended to cover any variations, uses or adaptations of the present disclosure, which follow the general principles of the present disclosure and include common knowledge or common technical means in the technical field not disclosed by the present disclosure. And the specification and embodiments are to be regarded as examples only, and the true scope and spirit of the disclosure are indicated by the following claims.

It should be understood that the present disclosure is not limited to the precise structure described above and shown in the drawings, and various modifications and changes can be made without departing from the scope thereof. The scope of the disclosure is limited only by the appended claims.

What is claimed is:

1. An integrated bone conduction sound generating device, comprising: a controller, a sound generating structure and a functional structure;
   wherein the controller converts acquired sound information into a corresponding electrical signal to drive the sound generating structure;
   the sound generating structure is connected with the controller, and when driven by the controller, is configured to generate a vibration signal; and
   the functional structure is connected with the sound generating structure, and when touching the oral cavity or the teeth of an object to which a sound is to be transmitted, is configured to transmit, through the oral cavity or the teeth, the vibration signal to the auditory system of the object to which a sound is to be transmitted,
   wherein the sound generating structure comprises an external structure and a plurality of energy conversion units accommodated in the external structure;
   wherein each of the plurality of energy conversion units comprises a power receiving element connected with the external structure and a vibrating element, each of the plurality of energy conversion units passes electric energy through the power receiving element to enable the energized receiving element to generate a magnetic field, and the vibrating element is located within a range of the magnetic field generated by the power receiving element;
   the controller sends the corresponding electrical signal to at least one energy conversion unit with a highest degree of matching between a resonance peak frequency of the vibrating element and a frequency band characteristic of the sound information in the plurality of energy conversion units, so that it is responsible for realizing a sound effect of a high frequency band and the other energy conversion units in the plurality of energy conversion units are responsible for realizing a sound effect of a low frequency band.

2. The integrated bone conduction sound generating device according to claim 1, wherein the power receiving element in each energy conversion unit comprises one first magnet
   body, and the vibrating element comprises one second magnet body or two second magnet bodies;
   or,
   the power receiving element in each energy conversion unit comprises two first magnet bodies, and the vibrating element comprises one second magnet body.

3. The integrated bone conduction sound generating device according to claim 2, wherein the first magnet body or the second magnet body comprises at least one magnet and/or at least one coil.

4. The integrated bone conduction sound generating device according to claim 3, wherein the plurality of energy conversion units further comprise an elastic element configured to effectuate connection between the external structure and the vibrating element.

5. The integrated bone conduction sound generating device according to claim 1, wherein the power receiving element of each energy conversion unit comprises a vibrating membrane, and the vibrating element comprises at least one piezoelectric sheet.

6. The integrated bone conduction sound generating device according to claim 5, wherein for each energy conversion unit, one piezoelectric sheet is attached to the middle of the vibrating membrane, and other piezoelectric sheets are attached to the side edges of the vibrating membrane respectively.

7. The integrated bone conduction sound generating device according to claim 1, wherein when there are at least two energy conversion units, the external structure is further provided with at least two accommodating cavities, so that each of the accommodating cavities accommodates one energy conversion unit.

8. The integrated bone conduction sound generating device according to claim 7, wherein the controller is configured to drive all or part of the energy conversion units in the sound generating structure to generate the vibration signal, according to an acquired sound source type and a corresponding frequency response range of the energy conversion units.

9. The integrated bone conduction sound generating device according to claim 8, wherein each of the energy conversion units corresponds to a different frequency response range.

10. The integrated bone conduction sound generating device according to claim 8, wherein each of the energy conversion units comprises at least one different frequency response range.

11. The integrated bone conduction sound generating device according to claim 1, wherein the functional structure comprises at least one of the following categories: dentures, dental appliances, pacifiers, grinding bars, chopsticks, spoons, forks, stirring bars, straws, pens, recording pens, popsicle shafts, toothbrushes, lollipop shafts, electronic cigarettes and cigarette holders.

12. The integrated bone conduction sound generating device according to claim 1, wherein the functional structure comprises at least two independent components, and adjacent independent components are detachably connected to each other.

13. The integrated bone conduction sound generating device according to claim 12, wherein the adjacent independent components are connected by at least one of snap connection, pin hole bayonet connection, magnetic connection, chute connection, elastic clasping connection, threaded connection and clamping connection.

14. The integrated bone conduction sound generating device according to claim 13, wherein the controller and the sound generating structure are respectively arranged on different independent components of the at least two independent components.

15. The integrated bone conduction sound generating device according to claim 14, wherein the independent component provided with the sound generating structure further comprises at least one of the following categories: dentures, dental appliances, pacifiers, grinding bars, chopsticks, spoons, forks, stirring bars, straws, pens, recording pens, popsicle shafts, toothbrushes, lollipop shafts, electronic cigarettes and cigarette holders.

16. The integrated bone conduction sound generating device according to claim 1, further comprising: at least one connecting structure configured to connect the sound generating structure and the functional structure.

17. The integrated bone conduction sound generating device according to claim 1, further comprising: a switch component;
then the controller is configured to drive the sound generating structure to generate the vibration signal, when it is determined that the switch component is turned on.

18. The integrated bone conduction sound generating device according to claim 1, further comprising: a power supply unit configured to supply power to the controller and the sound generating structure.

19. The integrated bone conduction sound generating device according to claim 1, further comprising: at least one indicating light;
then the controller is configured to start the at least one indicating light while the controller drives the sound generating structure to generate the vibration signal.

20. The integrated bone conduction sound generating device according to claim 1, further comprising: at least one light emitting device;
then the controller is configured to trigger the at least one light emitting device to emit light with color and/or light intensity according to the type of a sound source and/or the strength of the vibration signal.

21. The integrated bone conduction sound generating device according to claim 1, further comprising: a memory configured to store a sound source.

22. The integrated bone conduction sound generating device according to claim 1, further comprising: a data input interface for receiving a sound source sent by an external device in a wired and/or wireless way.

23. The integrated bone conduction sound generating device according to claim 22, wherein the data input interface comprises at least one of a USB interface, an eSATA interface, an SD card interface, a Micro SD card interface, an audio input interface, a video input interface, a Wi-Fi interface, a Bluetooth interface, a metal electrode and a microphone.

24. An integrated bone conduction sound generating method applied to the integrated bone conduction sound generating device according to claim 1, and comprising:
determining, by the controller, whether the functional structure touches the oral cavity or the teeth of the object to which a sound is to be transmitted;
upon a determination that the functional structure touches the oral cavity or the teeth of the object to which a sound is to be transmitted, driving, by the controller, the sound generating structure to generate a vibration signal, so as to transmit, through the oral cavity or the teeth, the vibration signal to the auditory system of the object to which a sound is to be transmitted.

25. The integrated bone conduction sound generating method according to claim 24, wherein the driving the sound generating structure to generate the vibration signal comprises:
driving all or part of the energy conversion units in the sound generating structure to generate the vibration signal, according to an acquired sound source type and a corresponding frequency response range of the energy conversion units.

\* \* \* \* \*